United States Patent

[11] 3,609,663

[72] Inventors William J. Bickford
Weston;
Richard G. Cease, Westwood, both of Mass.

[21] Appl. No. 846,214
[22] Filed July 30, 1969
[45] Patented Sept. 28, 1971
[73] Assignee Raytheon Company
Lexington, Mass.

[54] PREDETECTION SIGNAL-PROCESSING SYSTEM
7 Claims, 1 Drawing Fig.

[52] U.S. Cl. ........ 340/170 R, 325/305, 325/369
[51] Int. Cl. ........ H04b 01/12, H04b 01/26
[50] Field of Search ........ 325/369, 305, 304, 341, 342; 340/170

[56] References Cited

UNITED STATES PATENTS

| | | | |
|---|---|---|---|
| 3,204,185 | 8/1965 | Robinson | 325/433 X |
| 3,383,599 | 5/1968 | Miyagi | 325/305 |
| 3,433,903 | 3/1969 | Murray et al. | 325/432 X |
| 3,471,788 | 10/1969 | Bickford et al. | 325/369 |
| 3,518,680 | 6/1970 | McAuliffe | 325/423 X |

*Primary Examiner*—Donald J. Yusko
*Attorneys*—Harold A. Murphy and Joseph D. Pannone

ABSTRACT: A regenerative signal-processing system in which a multiplicity of incoming signals are combined prior to detection. By heterodyning each incoming signal with a common signal, difference frequency signals are generated. Each of these difference frequency signals controls a phase shift that is applied to the corresponding incoming signal and a resultant signal is formed and all resultant signals have the same phase and are combined to produce an output signal which is in the same frequency band as the incoming signal.

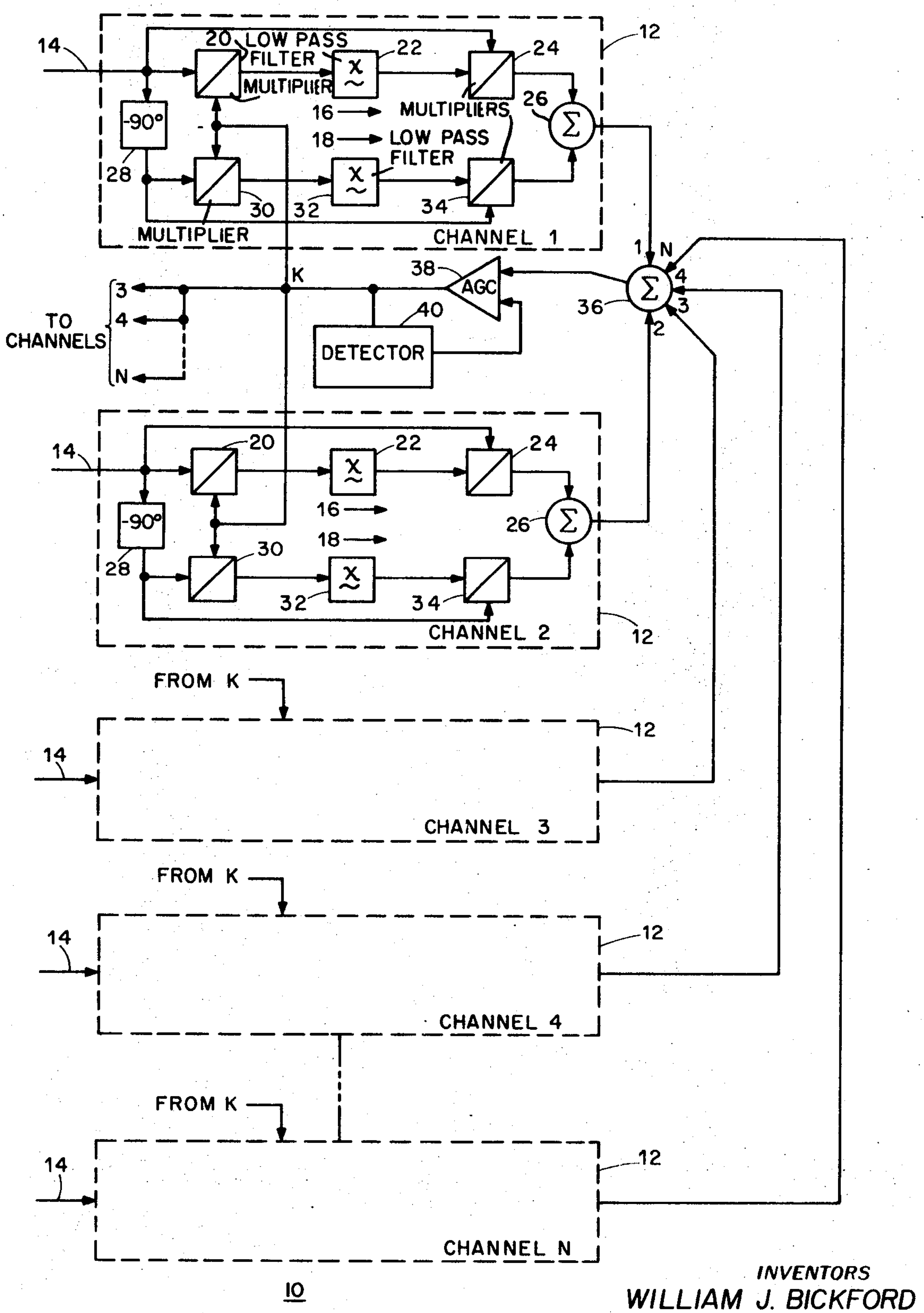
INVENTORS
WILLIAM J. BICKFORD
RICHARD G. CEASE
BY Irving S. Rappaport
ATTORNEY

PREDETECTION SIGNAL-PROCESSING SYSTEM

Background of the Invention

This invention relates to signal-processing systems and more particularly, to a signal-processing systems which operates on an incoming signal to provide an output signal which is independent of the phase of the input signal and an output signal which bears a specific relationship thereto. Processing apparatus of this sort is particularly useful in connection with diversity receivers which embody a plurality of installations all connected to receive incoming signal energy through connection to antennas which are either spaced-apart geographically or which have other characteristics tending to make them generally different in response.

It is frequently desirable to combine signals arriving at two or more points in a manner which provides maximum signal power to a load. However, it is usually difficult to process these signals so as to provide maximum signal power to the load. This is due in part to the fact that phase relationships of the mean frequencies of a given spectrum or the carriers of the incoming signals are generally independent of each other. The addition, therefore, of the two or more of such signals provides an output whose amplitude is dependent upon the vector sum of the incoming signals and results in an output varying as a function of the phase and amplitude relationships of the incoming signals. For example, when signals obtained from each of a plurality of antenna elements are added, the power transfer therefrom depends upon the relative location of each antenna element with respect to the transmitting source. Also, in an antenna array the spacing of elements becomes important, as does the spacing of transducers in an acoustical array. In other instances, the transmission medium may change to bring about undesirable phase differences in the incoming signals to be combined. While under certain conditions phase descrepancies may be corrected to permit maximum signal power transfer to the load, which in some instances may be a diversity receiver, in other cases the transmitting medium and direction of the source may vary in a manner such that phase correction becomes difficult, if not impossible to achieve.

It is therefore desirable to combine separate signals of differing phase to achieve maximum power transfer to a load, irrespective to the phase relationships of the incoming signals. It is also desirable to combine modulated signals from a common source to achieve maximum power output when such signals are received by a plurality of antenna elements. In other instances, it is required that signals from a plurality of antenna elements be combined in an efficient manner when frequency diversity transmission is employed. Finally, it may be desirable to combine in an efficient manner individual signals which contain the same information when received irrespective of the transmission or receiving medium.

In the past it has been customary to provide postdetection combining processes in an effort to achieve the above recited signal translation functions and at the same time minimize the reception of noise. However, when the predetection signal to noise ratio is such that noise degrades the detection process, postdetection combining, that is combining said signals after detection, no longer yields maximum signal power. Predetection combining can be used to avoid the undesirable results associated with postdetection combining. However, predetection combining requires that the signals to be combined be in phase at any given instant of time and, as a result, is frequently difficult to achieve and requires complex circuitry capable of adjustment to compensate for carrier phase differences. While signals combined by this process provide a more favorable signal to noise ratio at the input to the detection device, the difficulty of adjusting for individual signal phase differences results in complex structure often including a number of phase comparison and feedback control devices. For example, when four signals are to be combined, it is generally necessary to provide at least three degenerative feedback systems to minimize phase differences of three of the incoming signals relative to one of such signals.

In many instances it is desirable to provide an improved signal-processing system in which the phase differences associated with a plurality of incoming signals can be compensated or rendered negligible, said signals later being combined to provide an output signal which exhibits the desirable characteristics associated with, and is particularly adapted to predetection combining, such improved signal characteristic including, for example, signal to noise ratio, form factor, and the like.

It is therefore desirable to provide an improved signal-processing system in which the phase differences associated with incoming signals are effectively compensated or rendered negligible so as to provide output signals of like phase which are particularly suited for predetection combining and are substantially independent of the phase of the incoming signals. This arrangement may be conveniently termed a synthetic phase isolator or predetection signal-processing system. Such a system is described in U.S. Pat. No. 3,471,788 entitled, "-Predetection Signal-Processing System" filed on July 1, 1966. In accordance with the invention described in the above identified copending application, in order to add signals before detection, often called predetection combining, each of which have the same information content, the relative phase of these signals, as noted, must be substantially zero during the addition process. The relative phase of these predetected signals is made zero by synthesizing or generating for each incoming signal, a synthetic signal having a phase that is equal to but opposite from that of an incoming signal. The heterodyning of each of these synthesized signals with incoming signals produces resultant signals that have the same phase and are therefore isolated from the incoming signals. The synthesized signals are generated by mixing a common signal with each of the incoming signals. This signal processing is termed synthetic phase isolation.

The above-described system uses a predetection signal-processing technique that is regenerative in that it accepts signals at one IF frequency and shifts them to a new IF frequency. In some applications, this frequency translation is undesirable. In the present invention this undesirable frequency translation is eliminated by modifying the signal so as to change the carrier phase. As in the copending application Ser. NO. 562,375, frequency differences between two channels can be corrected up to the limit of control determined by the filter bandwidth.

The advantages of the present invention include:

(1.) The bandwidth of the regenerative circuit or the circuit that controls the rate of change of phase is a low-pass filter which is easily changed. This is not true of an RLC filter. (2.) The system is regenerative at a frequency at or about zero Hz. (3.) If there are frequency errors, they appear as low frequency signals in the processor channel at the value of the frequency difference between the input and output signal. This information can be used for AFC, since not only frequency but sense can be determined. (4.) By not shifting the frequency, the unit can be used with existing receivers at say 70 MHz. IF using the final demodulators without modification.

SUMMARY OF THE INVENTION

The above objects, advantages and features of the present invention as well as others are achieved by providing means for receiving input information signals of varying relative phase, a pair of means each including heterodyning, combining and filtering means serially connected to said receiving means for providing output signals containing said information and with the relative phase of the output signals substantially independent of said input signals and the frequency of said output signals unshifted in frequency from said input signals, and feedback means fed by said output signals including a loop regenerative only at approximately 0 Hz., said loop including means for multiplying said information containing signals with said input signals.

BRIEF DESCRIPTION OF THE DRAWING

The FIG. is a schematic diagram showing a predetection signal-processing system embodying the present invention.

DESCRIPTION OF THE PREFERRED EMBODIMENTS

The FIG. shows a predetection signal-processing system 10 having a plurality of channels 1, 2, 3, 4...N. Shown in the dotted blocks 12 each of the channels 1–N has an input signal applied thereto on input line 14 as shown with respect to channel 1. Each channel 12 includes two paths 16 and 18. The input signal on line 14 is applied to path 16 via a multiplier 20 which more specifically is a mixer which functionally provides a multiplying operation which will be described later. The output from the multiplier 20 is applied to a low-pass filter 22 whose output is applied to another multiplier 24, which also more specifically is a mixer. The input signal on line 14 is also applied directly to the multiplier 24. The output of multiplier 24 is applied to a summing circuit 26. The input signal is applied to path 18 first through a phase shifter 28 which applies a −90° phase shift to the incoming signal on line 14. The 90° shifted signal is then applied to a multiplier 30 which operates in the same manner as the multiplier 20 and 24. The output from the multiplier 30 is fed to a low-pass filter 32 whose filtered output is applied to another multiplier 34. The −90° phase shifted signal is also applied directly to the multiplier 34. The output from multiplier 34 is combined in the summer 26 with the output from the multiplier 24.

Each of the channels 12 have the same basic configuration as that described above with respect to channel 1. The outputs from the summers 26 of each of the channels 1–N are all applied to a summing circuit 36 where they are all combined and fed to an automatic gain control amplifier 38. In order to maintain the output from the amplifier 38 constant, a detector 40 is provided in a feedback loop from the output of the amplifier 38 back to its input. The output from amplifier 38 is applied as a feedback signal from point K to the multipliers 20 and 30 respectively in each of the channels 1–N. The point K is shown with connections to the respective multipliers 20 and 30 of each of the channels 1–N.

Each of the channels 1–N operates such that the output signal applied from each channel 1–N to the summer 36 is at essentially the same frequency as the input signal applied on line 14. The input signal applied to line 14 may be, for example:

$A\cos(\omega_1 b t+\Phi$ (1)

Assume that the resultant signal from the summer 36 is:

$B\cos \omega_1 t$ 10 10 (2)

The resultant of the multiplier process provided by multiplier 20 is a DC signal proportional to the signal amplitudes and the phase differences and is:

$AB[\cos\Phi+\cos(2\omega_1 t+\Phi]$ (3)

Due to the −90° phase shift provided by the phase shifter 28, the signal applied to the multiplier 30 is:

$A\sin(\omega_1 t+\Phi$ (4)

The output resulting from the multiplying process at multiplier 30 is also proportional to the signal amplitudes and the phase differences but because of the phase shift is represented by:

$AB[\sin\Phi B\mathrm{YZ}\sin(2\omega_1 t+\Phi)]$ (5)

Therefore, the input signal is provided in terms of the "in phase" and "Quadrature phase" amplitudes. The in phase amplitude (3) is fed to the low-pass filter 22 while the quadrature amplitude (5l) is fed to the low-pass filter 32. The output of the low-pass filter 22 is:

$AB\cos\Phi$ (6) while the output of the low-pass filter 32 is:

$AB\sin\Phi$ (7)

The output (6) of the low-pass filter 22 is multiplied in the multiplier 24 together with the in phase amplitude (1) of the incoming signal on line 14. Similarly, the output (7) from the low-pass filter 32 is multiplied in the multiplier 34 together with the −90° phase shifted quadrature phase amplitude of the incoming signal (1). This multiplying process provided by multipliers 24 and 34 takes the in phase and quadrature phase samples of the signals and weighs them to create at the summer 26 the following:

$A^2B[\cos \omega_1 t+2\Phi+\cos(\omega_1 t)]$ (8) $A^2B[\cos\omega_1 t-\cos(\omega_1 t+2\Phi)]$ (9) The two signals 8) and (9) which are combined in the summing circuit 26 provide the output signal at the same frequency as the input signal (1). In this process ration squared weighting has been applied. In the summing circuit 36, the phase shifted signals from the channels 1–N are added togther. The output of the summing circuit 36 is applied to the automatic gain control amplifier 38 whose amplitude is maintained constant through a detector 40 provided in a feedback loop. The output from the amplifier 38 is supplied as a feedback to each of the multipliers 20 and 30 is supplied as a feedback to each of the mjltipliers 20 and 30 of each of the channels respectively to provide the necessary input to achieve the desired multiplication at each of these multipliers.

The predetection signal-processing system 10 modifies the incoming signal by changing the carrier phase. The speed at which the carrier phase can be changed is determined by the bandwidth of the low-pass filters 22 and 32. As the radians of phase change per second become large a frequency correction is made. This is necessary if the incoming signals differ slightly in frequency. It is possible to correct the frequency differences between two or more channels up to the limit of control determined by the filter bandwidth. The advantages of the present invention are that the input frequency is essentially equal to the output frequency and the system is regenerative only at a frequency at or near ΦHz.

Another advantage of this system is that the frequency errors if they exist, appear only as low frequency signals in the processor channel. This information can be used for automatic frequency control, since not only frequency but sense can be determined. Also by not shifting the frequency, the present system can be used with existing receivers at, for example, 70 MHz. IF using the final demodulators without any modification.

The present invention may have applicability in a number of systems. One such system for example is a type of troposcanning system.

We claim:

1. In combination:

means for receiving input information signals of varying relative phase;

a pair of means each including heterodyning, combining and filtering means serially connected to said receiving means for providing output signals containing said input information and with the relative phase of the output signals substantially independent of said input information signals and the frequency of said output signals substantially unshifted in frequency from said input information signals; and feedback means fed by said output signals including a loop regenerative only at approximately zero Hz., said loop including means for multiplying said information containing output signals with said information signals.

2. A system comprising:

means for receiving input information signals of varying relative phase;

at least first and second multiplying means coupled in parallel to said receiving means; said filtering filtering means for filtering information signals from each of said first and second multiplying means;

at least third and fourth multiplying means for multiplying the outputs of each of filtering means with said input information signals;

means for summing the outputs from each of said third and fourth multiplying means to provide output signals containing said input information and with the relative phase of the output signals substantially independent of said input information signals and the frequency of said output signals unshifted in frequency from said input information signals; and feedback means fed by said output signals including a loop regenerative only at approximately 0 Hz. connected to each of said first and second multiplying means for multiplying said output signals with said input information signals.

3. A system comprising:

means for receiving input information signals of varying relative phase in at least first and second channels;

at least a first pair of multiplying means coupled in parallel to said first and second channels;

a plurality of filtering means corresponding to each of said multiplying means for filtering said input information signals from said corresponding multiplying means;

at least a second pair of multiplying means coupled to each of said filtering means for multiplying the outputs of each of said filtering means with said input information signals;

means for summing the outputs from said second pair of multiplying means to provide output signals containing said input information and with the relative phase of said output signals substantially independent of the phase of said input information signals substantially independent of the phase of said input information signals and the frequency of said output signals unshifted in frequency from the frequency of said input information signals; and feedback means fed by said output signals including a positive feedback loop regenerative only at approximately 0 Hz. connected to each of said first pair of multiplying means for multiplying said output signals with said input information signals.

4. A system in accordance with claim 3 wherein said positive feedback loop includes a linear-amplifying means.

5. A system comprising:

means for receiving input information signals of varying relative phase in a plurality of input channels;

a plurality of pairs of combining circuits, each of which pair is coupled to a corresponding input channel;

one of each of said pairs of combining circuits including a first multiplying means to which said input information signals are applied, a filtering means for filtering the output from said first multiplying means, and a second multiplying means for multiplying the output from said filtering means and said input information signals;

the other of each of said pairs of combining circuits including means for shifting the phase of said input information signal, a first multiplying means to which the phase shifted input information signal is applied, a filtering means for filtering the output of said first multiplying means, and a second multiplying means for multiplying the output of said filtering means and said input information signals;

means for summing the outputs from each of said second multiplying means to provide output signals containing said input signal information and with the relative phase of said output signals substantially independent of said input information signals and the frequency of said output signals unshifted in frequency from said input information signals; and feedback means fed by said output signals including a positive feedback loop regenerative only at approximately 0 Hz. connected to each of said first multiplying means in said plurality of input channels for multiplying said output signals with said input information signals.

6. A system according to claim 5 wherein: said filtering means are all low-pass filters. A system according to claim 5 wherein: said positive feedback loop includes means for summing the outputs from said summing means associated with each of said input channels to form a single output and means for controlling the amplitude of said single output.

7. A system according to claim 5 wherein: said positive feedback loop includes means for summing the outputs from said summing means associated with each of said input channels to form a single output and means for controlling the amplitude of said single output.